US012654995B2

(12) United States Patent
Gong et al.

(10) Patent No.: US 12,654,995 B2
(45) Date of Patent: Jun. 16, 2026

(54) AUTOMATIC CONVEYING DEVICE AND MAINTENANCE METHOD THEREFOR

(71) Applicant: Otis Elevator Company, Farmington, CT (US)

(72) Inventors: Xinwei Gong, Haining (CN); Lifei Cheng, Hangzhou (CN); Zhaoxia Hu, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 209 days.

(21) Appl. No.: 18/510,198

(22) Filed: Nov. 15, 2023

(65) Prior Publication Data

US 2024/0367944 A1 Nov. 7, 2024

(30) Foreign Application Priority Data

May 5, 2023 (CN) ........................ 202310498920.X

(51) Int. Cl.
*B66B 25/00* (2006.01)
*B66B 21/04* (2006.01)
*B66B 27/00* (2006.01)

(52) U.S. Cl.
CPC ............ *B66B 25/006* (2013.01); *B66B 21/04* (2013.01); *B66B 27/00* (2013.01)

(58) Field of Classification Search
CPC ....... B66B 25/006; B66B 21/04; B66B 27/00; B66B 23/18; B66B 23/024; B66B 29/00
See application file for complete search history.

(56) References Cited

U.S. PATENT DOCUMENTS 6,851,546 B2 2/2005 Lodge
7,494,004 B2 2/2009 Stolyar et al.
8,973,742 B2 3/2015 Tout et al.
9,429,489 B2 8/2016 Goldstein
(Continued)

FOREIGN PATENT DOCUMENTS

CN 1894151 B 12/2010
CN 101759089 B 11/2012
(Continued)

OTHER PUBLICATIONS

IPSearch History Jan. 17, 2026 UTC; InnovationQ+; https://iq.ip.com/discover (Year: 2026).*
(Continued)

*Primary Examiner* — Gene O Crawford
*Assistant Examiner* — Abby A Jorgensen
(74) *Attorney, Agent, or Firm* — CANTOR COLBURN LLP

(57) ABSTRACT

An automatic conveying device and a maintenance method therefor. The automatic conveying device includes a fixed step drive wheel, and a step driven wheel located on a movable bracket; a step chain in transmission connection with the step drive wheel and the step driven wheel; a tensioning device that acts on the movable bracket to maintain the step chain in tension; a sensor device that detects a displacement of the movable bracket; and a processor configured to send a first warning signal when a single-trip displacement of the movable bracket exceeds a first threshold, and to send a second warning signal when a accumulative displacement of the movable bracket exceeds a second threshold.

16 Claims, 3 Drawing Sheets

(56) References Cited

U.S. PATENT DOCUMENTS

| | | | | |
|---|---|---|---|---|
| 10,393,602 | B2 | 8/2019 | D'Sa et al. | |
| 10,654,656 | B2 | 5/2020 | Mäder | |
| 10,807,804 | B2 | 10/2020 | Kulick, III et al. | |
| 10,988,348 | B1 * | 4/2021 | Schmidt | B66B 29/00 |
| 11,440,776 | B2 | 9/2022 | Wenlin et al. | |
| 2002/0183148 | A1 | 12/2002 | Goryca | |
| 2010/0122889 | A1 * | 5/2010 | Boge | B66B 23/02 198/321 |
| 2017/0297874 | A1 * | 10/2017 | Borthakur | F16H 7/00 |
| 2020/0087116 | A1 * | 3/2020 | Cai | B66B 23/20 |
| 2020/0200628 | A1 * | 6/2020 | Park | G01L 5/102 |
| 2022/0153555 | A1 * | 5/2022 | Hirai | B66B 27/00 |
| 2023/0356983 | A1 * | 11/2023 | Ortbauer | B66B 23/20 |

FOREIGN PATENT DOCUMENTS

| | | | | |
|---|---|---|---|---|
| CN | 103946133 | A | 7/2014 | |
| CN | 203976201 | U | 12/2014 | |
| CN | 103253589 | B | 6/2015 | |
| CN | 106335837 | B | 7/2015 | |
| CN | 104176609 | B | 3/2016 | |
| CN | 104444751 | B | 7/2016 | |
| CN | 206068725 | U | 4/2017 | |
| CN | 104395640 | B | 6/2017 | |
| CN | 107108180 | B | 8/2017 | |
| CN | 104870957 | B | 9/2017 | |
| CN | 105366523 | B | 10/2017 | |
| CN | 104903692 | B | 1/2018 | |
| CN | 105829236 | B | 2/2018 | |
| CN | 106629366 | B | 6/2018 | |
| CN | 106629367 | B | 7/2018 | |
| CN | 107021412 | B | 10/2018 | |
| CN | 104843455 | B | 6/2019 | |
| CN | 107636356 | B | 7/2019 | |
| CN | 209480999 | U | 10/2019 | |
| CN | 110002329 | B | 11/2019 | |
| CN | 110562835 | A | 12/2019 | |
| CN | 111071907 | A | 4/2020 | |
| CN | 110271944 | B | 7/2020 | |
| CN | 107806829 | B | 8/2020 | |
| CN | 108946418 | B | 9/2020 | |
| CN | 111824884 | A | 10/2020 | |
| CN | 112061945 | A | 12/2020 | |
| CN | 110891891 | B | 1/2021 | |
| CN | 112649294 | A | 4/2021 | |
| CN | 110498330 | B | 6/2021 | |
| CN | 112875479 | A | 6/2021 | |
| CN | 112875480 | A | 6/2021 | |
| CN | 112875483 | A | 6/2021 | |
| CN | 111332926 | B | 9/2021 | |
| CN | 109665264 | B | 11/2021 | |
| CN | 114057077 | A | 2/2022 | |
| CN | 114057079 | A | 2/2022 | |
| CN | 114072348 | A | 2/2022 | |
| CN | 215905671 | U | 2/2022 | |
| CN | 109983252 | B | 3/2022 | |
| CN | 111479769 | B | 5/2022 | |
| CN | 114516583 | A | 5/2022 | |
| CN | 114945529 | A | 8/2022 | |
| CN | 115210168 | A | 10/2022 | |
| CN | 112639426 | B | 1/2023 | |
| DE | 20210210 | U1 | 1/2003 | |
| DE | 10322955 | A1 * | 1/2004 | B66B 27/00 |
| EP | 1634843 | A2 | 3/2006 | |
| EP | 1850087 | B1 | 8/2009 | |
| EP | 2209717 | B1 | 2/2013 | |
| EP | 2485972 | B1 | 9/2018 | |
| EP | 3475196 | B1 | 3/2023 | |
| JP | 2006273549 | A | 10/2006 | |
| JP | 2009132513 | A * | 6/2009 | |
| JP | 6968957 | B1 | 10/2021 | |
| JP | 2022026078 | A * | 2/2022 | B66B 23/18 |
| JP | 7035133 | B2 | 3/2022 | |
| WO | WO-2020207895 | A1 * | 10/2020 | B66B 29/04 |
| WO | WO-2021140154 | A2 * | 7/2021 | B66B 25/006 |
| WO | 2021181284 | A1 | 9/2021 | |
| WO | 2022151131 | A1 | 7/2022 | |
| WO | 2023281583 | A1 | 1/2023 | |

OTHER PUBLICATIONS

European Search Report for Application No. 24173561.2, Issued Oct. 10, 2024, 8 Pages.

* cited by examiner

AUTOMATIC CONVEYING DEVICE AND MAINTENANCE METHOD THEREFOR

FOREIGN PRIORITY

This application claims priority to Chinese Patent Application No. 202310498920.X, filed May 5, 2023, and all the benefits accruing therefrom under 35 U.S.C. § 119, the contents of which in its entirety are herein incorporated by reference.

FIELD OF THE INVENTION

The present invention relates to the field of automatic conveying devices, in particular to a device for detecting step chain elongation in an automatic conveying device and an automatic conveying device maintenance method based on the device.

BACKGROUND OF THE INVENTION

Existing automatic conveying devices, such as escalators or moving walkways, include a plurality of steps for passengers to stand on, where each of the steps is connected to a step chain, which, driven by a drive wheel, performs circulating movement. During the long-term use of the automatic conveying device, the step chain will be gradually elongated, resulting in a gradual increase in the gap between the steps. Some existing automatic conveying devices are provided with contact sensors with rods and springs that will be triggered when the step chain is elongated to a certain extent, which will stop the automatic conveying device from operating and manual maintenance is then required. Contact sensors are not capable of continuous detection and are prone to damage during maintenance. In addition, contact sensors cannot measure the accumulative elongation of the step chain accurately.

On the other hand, when the gap between the steps has reached a certain extent, the step chain needs to be replaced. The existing method for determining whether the step chain needs to be replaced comprises measuring the gap between the steps. However, it is difficult to conduct such monitoring automatically.

SUMMARY OF THE INVENTION

The object of the present application is to solve or at least alleviate the problems existing in the prior art.

According to one aspect, an automatic conveying device is provided, comprising: a step drive wheel fixedly mounted at a first end of the automatic conveying device; a movable bracket arranged at a second end opposite to the first end of the automatic conveying device; a step driven wheel disposed on the movable bracket; a step chain coupled to the step drive wheel and the step driven wheel; a tensioning device that acts on the movable bracket to maintain the step chain in tension; a sensor device that detects a displacement of the movable bracket; and a processor configured to send a first warning signal when a single-trip displacement of the movable bracket exceeds a first threshold, and to send a second warning signal when a accumulative displacement of the movable bracket exceeds a second threshold.

Optionally, in an embodiment of the automatic conveying device, the first warning signal is indicative of shortening the step chain.

Optionally, in an embodiment of the automatic conveying device, the second warning signal is indicative of replacing the step chain.

Optionally, in an embodiment of the automatic conveying device, the sensor device includes a displacement sensor for directly detecting a displacement of the movable bracket; or the sensor device includes a non-contact sensor for detecting a distance between a first position moving with the movable bracket and a fixed second position for reference, and for calculating the displacement of the movable bracket based on a change in the distance.

Optionally, in an embodiment of the automatic conveying device, the non-contact sensor is a distance sensor based on laser, magnetism or infrared light.

Optionally, in an embodiment of the automatic conveying device, the movable bracket is disposed on a fixed bracket and is capable of translating along a horizontal track of the fixed bracket, wherein the first position and the second position for reference are located on the movable bracket and the fixed bracket respectively and are at the same level.

Optionally, in an embodiment of the automatic conveying device, a pair of non-contact sensors is provided at corresponding positions of the movable bracket and the fixed bracket on both sides of the automatic conveying device in a width direction to detect elongations of step chains on both sides, wherein a processor is connected to the pair of non-contact sensors.

Optionally, in an embodiment of the automatic conveying device, the processor sends a third warning signal when a deviation of the distance detected by the pair of non-contact sensors is greater than a third threshold.

Optionally, in an embodiment of the automatic conveying device, the third warning signal is indicative of an uneven elongation.

Optionally, in an embodiment of the automatic conveying device, the processor is in the cloud, the sensor device is connected to a wireless communication module, where the sensor device performs detection at intervals and transmits detection data to the processor via the wireless communication module.

Optionally, in an embodiment of the automatic conveying device, the first threshold and the second threshold are determined based on a length of the automatic conveying device and a moving speed of the movable bracket.

Optionally, in an embodiment of the automatic conveying device, the processor is further configured to send a fourth warning signal indicative of an abnormal elongation of the step chain when the moving speed of the movable bracket exceeds a fourth threshold.

According to another aspect, a maintenance method for an automatic conveying device is provided, comprising: detecting, by means of a sensor device, a displacement of a movable bracket carrying a step driven wheel; prompting to shorten a step chain when a single-trip displacement of the movable bracket exceeds a first threshold; and prompting to replace the step chain when a accumulative displacement of the movable bracket exceeds a second threshold.

Optionally, the method also comprises: detecting, using a displacement sensor, the displacement of the movable bracket directly; or detecting, using a non-contact sensor, a distance between a first position moving with the movable bracket and a fixed second position for reference, and calculating the displacement of the movable bracket based on a change in the distance.

Optionally, the method further comprises: detecting, by means of a pair of non-contact sensors arranged at corresponding positions on both sides of the automatic conveying device in a width direction, elongations of step chains on both sides; and sending a third warning signal when a deviation of the distance detected by the pair of non-contact sensors is greater than a third threshold.

Optionally, the method further comprises: detecting a moving speed of the movable bracket; and sending a fourth warning signal indicative of an abnormal elongation of the step chain when the moving speed of the movable bracket exceeds a fourth threshold.

The device and method according to the present invention can accurately detect the elongation of the step chain in real time.

BRIEF DESCRIPTION OF THE DRAWINGS

With reference to the accompanying drawings, the disclosure of the present application will become easier to understand. Those skilled in the art would easily understand that these drawings are for the purpose of illustration, and are not intended to limit the protection scope of the present application. In addition, in the figures, similar numerals are used to denote similar components, where.

DETAILED DESCRIPTION OF EMBODIMENT(S) OF THE INVENTION

Figure 1:
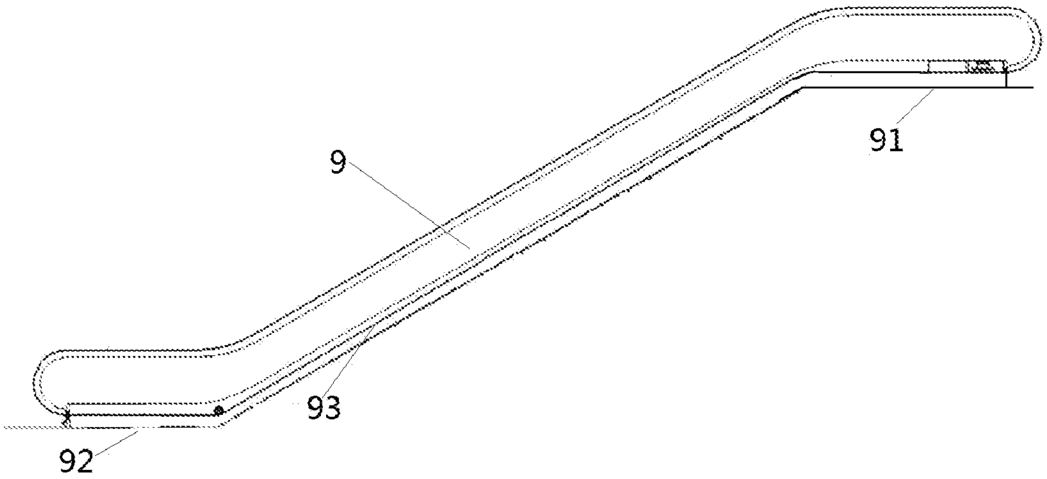
FIG. 1 shows a structural schematic diagram of an automatic conveying device according to an embodiment.

Reference is made first to FIG. 1, a schematic diagram of an automatic conveying device is shown. In the illustrated embodiment, the automatic conveying device 9 is an escalator for transporting passengers between different floors. Alternatively, the automatic conveying device can also be a moving walkway for horizontal or gradient transportation. The automatic conveying device 9 comprises a first end 91 and a second end 92 opposite to each other, and a middle section 93 between the first end 91 and the second end 92.

Figure 2:
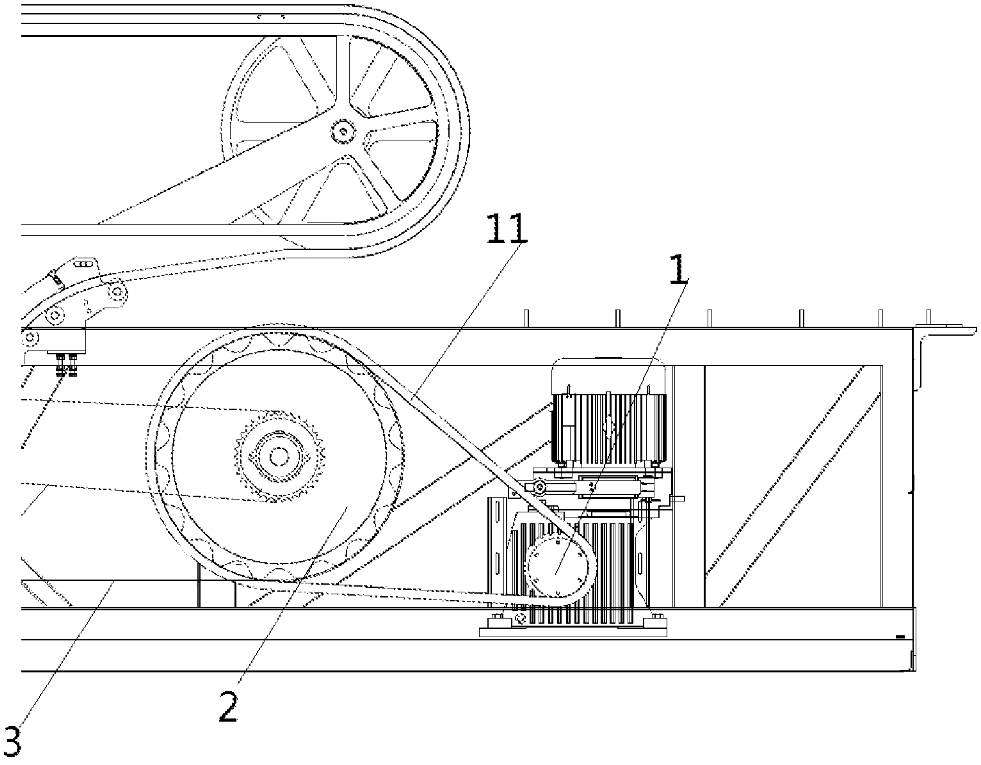
FIG. 2 shows a structural schematic diagram of a first end of an automatic conveying device according to an embodiment.

With continued reference to FIG. 2, the structure at the first end 91 of the automatic conveying device is shown. A drive device, such as a drive motor, is provided in the machine room at the bottom of the first end 91 of the automatic conveying device, the output shaft 1 of which drives the fixedly arranged step drive wheel 2 to rotate through a drive belt 11, and chain 3 wraps around the step drive wheel 2 at the first end 91. Although only a single step drive wheel 2 is shown in the plan view of FIG. 2, there are actually two step drive wheels 2 and two corresponding step chains 3 arranged on both sides of the automatic conveying device in the width direction, where the steps are installed between the two step drive wheels 2 and the two step chains 3.

Figure 3:
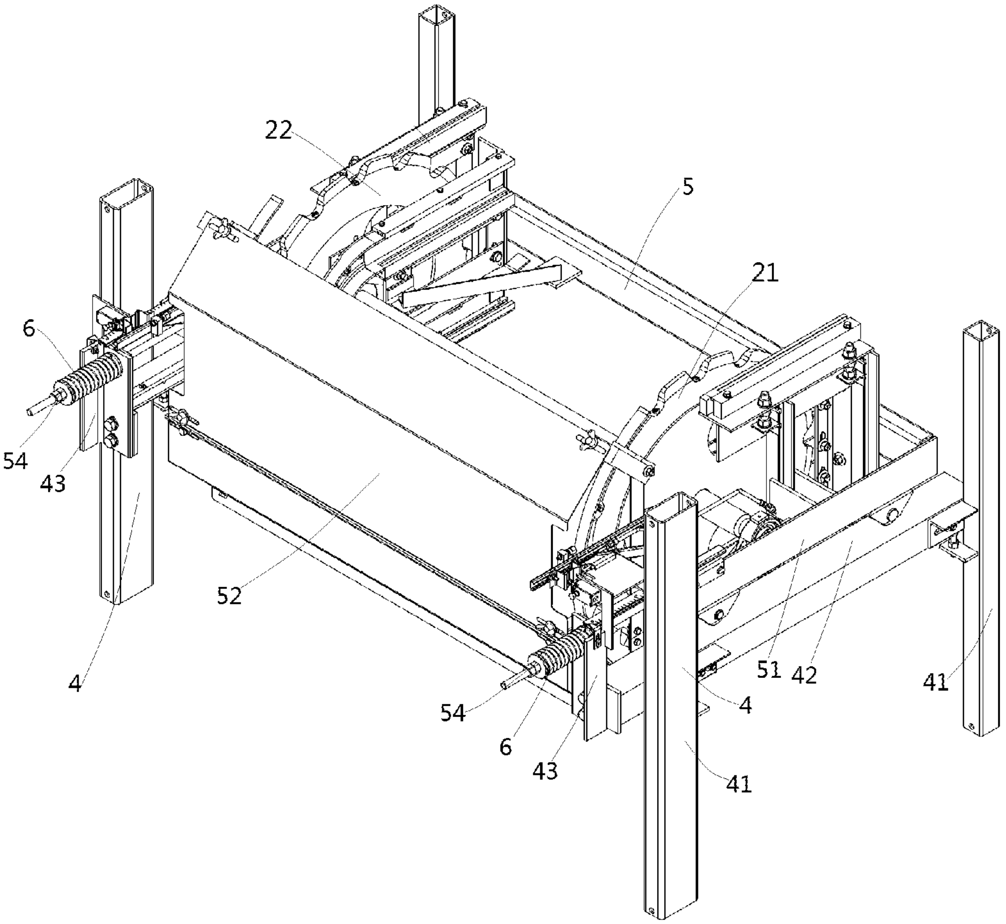
FIG. 3 shows a structural schematic diagram of a second end of an automatic conveying device according to an embodiment.

With continued reference to FIG. 3, step driven wheels 21, 22 are provided at the second end of the automatic conveying device. Specifically, step driven wheels 21, 22 are located on a movable bracket 5. Accordingly, step chains 3 on both sides (not shown in FIG. 3) wraps around the step driven wheels 21, 22 at the second end 92. The difference between a step driven wheel and a step drive wheel is that a power unit such as a drive motor is not provided at the second end 92 to drive the step driven wheel, so that the step driven wheel can be disposed on the movable bracket 5 to be movable, while the step drive wheel is fixedly arranged because it needs to be coupled to the power unit. The step chains 3 are connected to a plurality of steps between the first end 91 and the second end 92. When the drive device drives the step drive wheels to rotate, the step chains will drive the respective steps for circulating movement.

A tensioning device 6 is also provided, which acts on the movable bracket 5 so that the movable bracket 5 tends to move in the direction away from the step drive wheel 2 to maintain the tension of the step chains and maintaining the step chains in tension when the step chains are elongated. In the illustrated embodiment, the tensioning devices 6 are a pair of springs on both sides of the movable bracket 5. More specifically, one end of the tensioning device 6 in the form of springs abuts against a retaining plate 43 and the other end abuts against a flange 54 connected to a strut of the movable bracket 5, thereby tending to push the movable bracket 5 to the left in the figure. In the illustrated embodiment, the movable bracket 5 can move along a horizontal track defined by a pair of fixed brackets 4 on both sides. The fixed brackets 4 each consists of two longitudinal beams 41 and a cross beam 42 between the two longitudinal beams. The retaining plate 43 is connected to the outer longitudinal beam 41. Cross beams 42 define a horizontal track. The movable bracket 5 consists of a bracket body 51 on both sides and a middle connection part 52. The bracket body 51 includes rollers so as to be arranged on the cross beams 42 of the fixed brackets 4. In an alternative embodiment, other forms of tracks may be provided on the fixed brackets.

Figure 4:
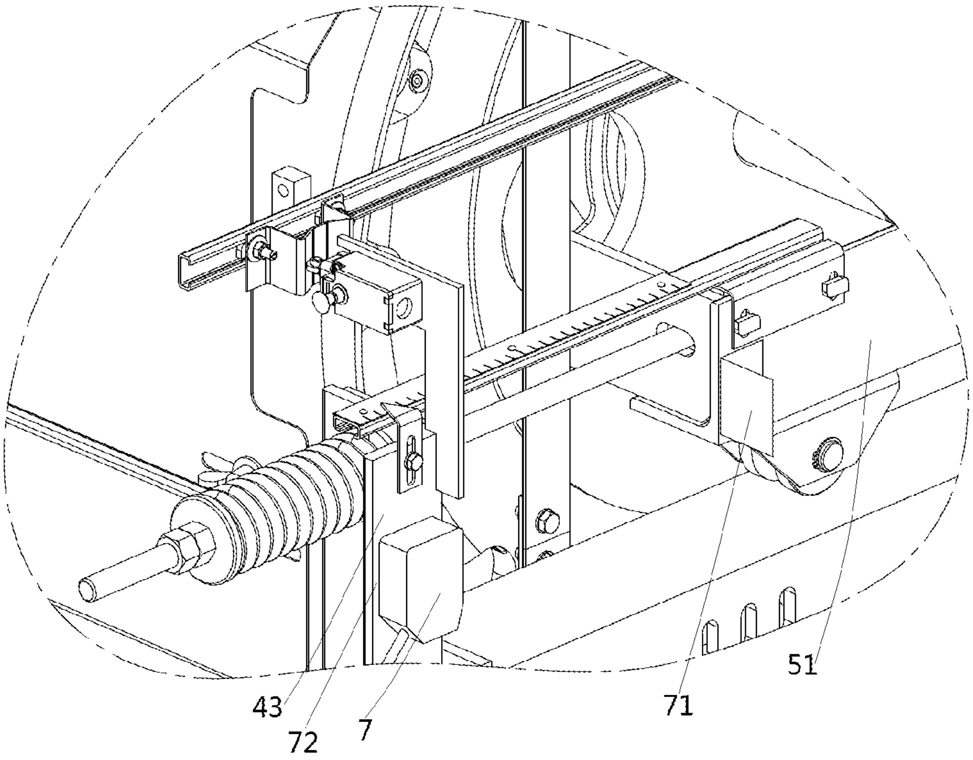
FIG. 4 shows a local enlarged view in FIG. 3.

With continued reference to FIG. 4, a sensor device is shown. The sensor device is used to detect the displacement of the movable bracket 5. For example, the sensor device includes a displacement sensor to directly detect the displacement of the movable bracket 5; or, the sensor device includes a non-contact sensor 7 to detect the distance between a first position 71 moving with the movable bracket and a fixed second position for reference 72 and to calculate the displacement of the movable bracket 5 based on the change in the distance. The non-contact sensor 7 can, based on its type, be mounted on the movable bracket 5, the fixed bracket 4, or both the movable bracket 5 and the fixed bracket 4. Alternatively, the non-contact sensor 7 does not have to be mounted on the fixed bracket 4, but can also be arranged at any fixed reference position at the second end of the automatic conveying device, such as on the ground or any fixed casing. When a non-contact distance sensor is employed, the non-contact sensor 7 is, for example, a distance sensor based on light (e.g., laser, infrared light, etc.). Alternatively, the non-contact sensor 7 can be a magnetic-based distance sensor or an appropriate distance sensor based on other concepts. Optionally, the detection accuracy of the non-contact sensor 7 can reach 0.1 mm or higher, thereby accurately detecting the distance between the first position 71 moving with the movable bracket 5 and the fixed second position for reference 72.

On the other hand, the non-contact sensor 7 can be connected to a processor to transmit data to the processor. Since the displacement of the movable bracket 5 corresponds to the elongation of the step chain, the elongation of the step chain can therefore be accurately detected in this way. More specifically, the processor is configured to send a first warning signal when a single-trip displacement of the movable bracket 5 exceeds a first threshold. And, the processor also calculates the accumulative displacement of the movable bracket and sends a second warning signal when the accumulative displacement of the movable bracket exceeds a second threshold. It should be appreciated that a single-trip displacement refers to the displacement of the movable bracket in a single stroke, where the single stroke does not include reset operation. The accumulative displacement refers to the total displacement of the movable bracket before the step chain is replaced, where reset operation may be included.

In some embodiments, the processor is arranged locally and thus is connected directly with the non-contact sensor 7, thereby receiving signals directly. Alternatively, the processor can be arranged in the cloud, and the non-contact sensor is connected to a wireless communication module, where the non-contact sensor detects data at intervals and transmits the data to the processor via the wireless communication module. In some embodiments, a processor can be coupled to non-contact sensors of a plurality of automatic conveying devices. In some embodiments, a non-contact sensor can continuously detect displacement data in real time, or detect data at intervals, such as every other hour, so as to reduce the amount of data to be transmitted wirelessly.

In some embodiments, the first warning signal is indicative of shortening the step chain. Upon receipt of the first warning signal, maintenance personnel can reach the site to shorten the step chain, e.g., removing a portion of the step chain, so that the movable bracket 5 is basically reset to its original position, where such maintenance operations can be performed during non-peak hours of the automatic conveying device. Therefore, the device and method according to the embodiments of the present invention will not cause the automatic conveying device to stop suddenly and will minimize the impact on the normal operation of the automatic conveying device. In some embodiments, the second warning signal is indicative of replacing the step chain. It should be appreciated that, by using a non-contact sensor, the cumulative displacement of the movable bracket 5 can be detected, thereby detecting the total elongation of the step chain, so that it is possible to determine when to replace the step chain based on the total elongation of the step chain, rather than on the measurement of the gap between the steps, which makes the replacement of the step chain more standardized and controllable.

In some embodiments, the first position 71 on the movable bracket 5 and the second position for reference 72 on the fixed bracket 4 may be at the same level. In some embodiments, the first position 71 and the second position for reference 72 face each other and are arranged in the direction of movement of the movable bracket 5. The non-contact sensor may be a single component that is mounted at the first position 71 or the second position for reference 72, or the non-contact sensor may include two components that are mounted at the first position 71 and the second position for reference 72, respectively.

In some embodiments, only a single non-contact sensor may be arranged. In an alternative embodiment, a pair of non-contact sensors 7 is provided at corresponding positions of the movable bracket 5 and the fixed brackets 4 on both sides of the automatic conveying device in the width direction, so as to detect the elongations of the step chains on both sides respectively, where a processor is connected to the pair of non-contact sensors. In some embodiments, the processor sends a third warning signal when the deviation of the distance detected by the pair of non-contact sensors is greater than a third threshold. That is, the processor can send a third warning signal indicative of the uneven elongations when the elongations of the step chains on both sides are uneven. Upon receipt of the third warning signal, maintenance personnel can reach the site to find and solve the problems, so as to eliminate the existing safety hazards. Accordingly, the device and method according to some embodiments of the present invention may also detect uneven elongations of the step chains and associated faults.

In some embodiments, the specific values of the first and second thresholds depend on the initial length of the step chain. For step chains of different lengths, their elongation rates are also different. The first and second thresholds may therefore depend on the length of the automatic conveying device and the moving speed of the movable bracket. In some embodiments, the third threshold may be between 1 mm and 3 mm. In addition, the processor can also detect the moving speed of the movable bracket, i.e., the value of the displacement of the movable bracket being divided by time. The processor is also configured to send a fourth warning signal indicative of an abnormal elongation of the step chain when the moving speed of the movable bracket exceeds a fourth threshold. Upon receipt of the fourth warning signal, maintenance personnel may reach the site for various checks to eliminate problems and potential safety hazards.

According to the embodiments of the present invention, a maintenance method for an automatic conveying device is also provided, the method comprising: detecting, by means of a sensor device, a displacement of a movable bracket 5 carrying a step driven wheel; prompting to shorten a step chain when a single-trip displacement of the movable bracket exceeds a first threshold; and prompting to replace the step chain when a accumulative displacement of the movable bracket exceeds a second threshold.

Figure 5:
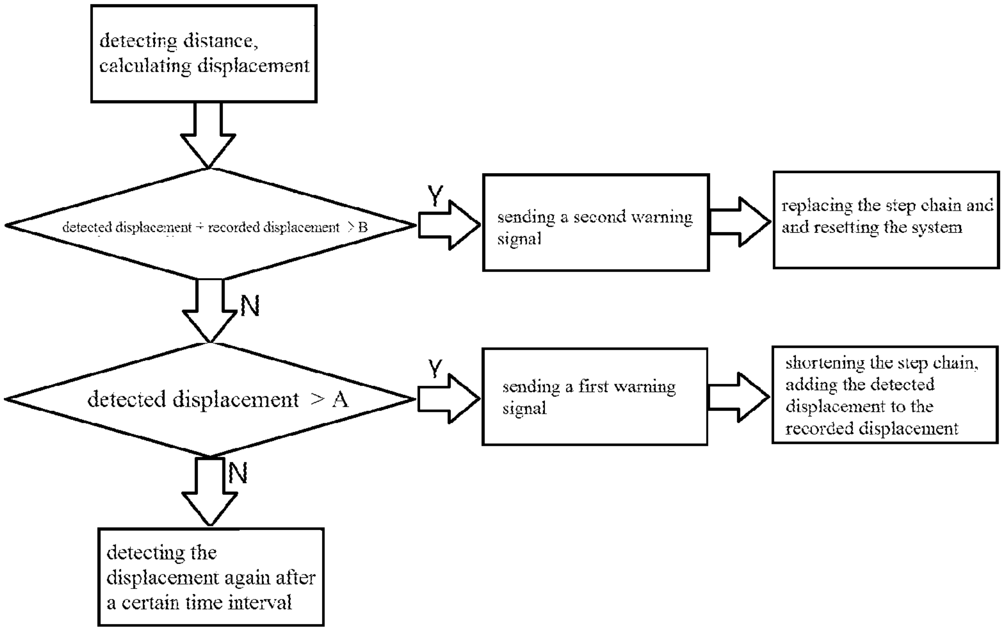
FIG. 5 shows a control flow diagram of a maintenance method for an automatic conveying device according to an embodiment of the present invention.

FIG. 5 illustrates exemplary control logic according to the method of the present invention. The control logic may be implemented using a controller, such as a processor-based controller programmed to perform the operations of FIG. 5. First, a non-contact sensor is used to detect the current detected displacement of the movable bracket, and then it is determined whether the accumulative displacement is greater than a second threshold B, where the accumulative displacement is the current detected displacement plus the recorded displacement. If yes, a second warning signal is sent, based on which the maintenance personnel can replace the step chain and reset the system parameters (clearing recorded displacement). If not, it is then determined whether the current detected displacement is greater than a first threshold A, and if yes, a first warning signal is sent, based on which the maintenance personnel can shorten the step chain and at the same time add the detected displacement to the recorded displacement; and if not, the detection and the above determination steps are performed again after a certain time interval, such as one hour.

In some embodiments, the method further comprises: detecting, by means of a pair of non-contact sensors arranged at corresponding positions on both sides of the automatic conveying device in the width direction, elongations of the step chains on both sides; and sending a third warning signal when the deviation of the distance detected by the pair of non-contact sensors is greater than a third threshold. In some embodiments, the method further comprises: detecting the moving speed of the movable bracket; and sending a fourth warning signal indicative of an abnormal elongation of the step chain when the moving speed of the movable bracket exceeds a fourth threshold.

The device and method according to the present invention can accurately detect the elongation of the step chain in real time, thereby making the maintenance of the step chain more precise and controllable and avoiding unexpected sudden stop of the automatic conveying device.

The specific embodiments of the present application described above are merely intended to describe the principles of the present application more clearly, where various components are clearly shown or described to facilitate the understanding of the principles of the present invention. Those skilled in the art may, without departing from the scope of the present application, make various modifications or changes to the present application. Therefore, it should be understood that these modifications or changes should be included within the scope of patent protection of the present application.

What is claimed is:

1. An automatic conveying device, comprising:

a step drive wheel fixedly mounted at a first end of the automatic conveying device;

a movable bracket arranged at a second end opposite to the first end of the automatic conveying device;

a step driven wheel disposed on the movable bracket;

a step chain coupled to the step drive wheel and the step driven wheel;

a tensioning device that acts on the movable bracket to maintain the step chain in tension;

a sensor device that detects a displacement of the movable bracket; and a processor configured to send a second warning signal when a accumulative displacement of the movable bracket exceeds a second threshold, B, where the accumulative displacement is the current detected displacement plus a recorded displacement; and send a first warning signal and add the current detected displacement to the recorded displacement, if the current detected displacement exceeds a first threshold A and the accumulative displacement does not exceed the second threshold B.

2. The automatic conveying device according to claim 1, wherein the first warning signal is indicative of shortening the step chain.

3. The automatic conveying device according to claim 1, wherein the second warning signal is indicative of replacing the step chain.

4. The automatic conveying device according to claim 1, wherein the sensor device includes a displacement sensor for directly detecting a displacement of the movable bracket; or the sensor device includes a non-contact sensor for detecting a distance between a first position moving with the movable bracket and a fixed second position for reference, and for calculating the displacement of the movable bracket based on a change in the distance.

5. The automatic conveying device according to claim 4, wherein the non-contact sensor is a distance sensor based on laser, magnetism or infrared light.

6. The automatic conveying device according to claim 4, wherein the movable bracket is disposed on a fixed bracket and is capable of translating along a horizontal track of the fixed bracket, wherein the first position and the second position for reference are located on the movable bracket and the fixed bracket respectively and are at the same level.

7. The automatic conveying device according to claim 4, wherein a pair of non-contact sensors is provided at corresponding positions of the movable bracket and the fixed bracket on both sides of the automatic conveying device in a width direction to detect elongations of step chains on both sides, wherein a processor is connected to the pair of non-contact sensors.

8. The automatic conveying device according to claim 7, wherein the processor sends a third warning signal when a deviation of the distance detected by the pair of non-contact sensors is greater than a third threshold.

9. The automatic conveying device according to claim 8, wherein the third warning signal is indicative of an uneven elongation.

10. The automatic conveying device according to claim 1, wherein the processor is in a distributed computing environment, and the sensor device is connected to a wireless communication module, where the sensor device performs detection at intervals and transmits detection data to the processor via the wireless communication module.

11. The automatic conveying device according to claim 1, wherein the first threshold and the second threshold are determined based on a length of the automatic conveying device and a moving speed of the movable bracket.

12. The automatic conveying device according to claim 8, wherein the processor is further configured to send a fourth warning signal indicative of an abnormal elongation of the step chain when a moving speed of the movable bracket exceeds a fourth threshold.

13. A maintenance method for an automatic conveying device, comprising:

detecting, by means of a sensor device, a displacement of a movable bracket carrying a step driven wheel;

sending a second warning signal to replace a step chain when an accumulative displacement of the movable bracket exceeds a second threshold B, where the accumulative displacement is the current detected displacement plus a recorded displacement;

sending a first warning signal to shorten the step chain (3) and adding the current detected displacement to the recorded displacement if the current displacement exceeds the first threshold A and the accumulative displacement does not exceed the second threshold B.

14. The maintenance method according to claim 13, wherein the method further comprises: detecting, using a displacement sensor, the displacement of the movable bracket directly; or detecting, using a non-contact sensor, a distance between a first position moving with the movable bracket and a fixed second position for reference, and calculating the displacement of the movable bracket based on a change in the distance.

15. The maintenance method according to claim 14, wherein the method further comprises: detecting, by means of a pair of non-contact sensors arranged at corresponding positions on both sides of the automatic conveying device in a width direction, elongations of step chains on both sides; and sending a third warning signal when a deviation of the distance detected by the pair of non-contact sensors is greater than a third threshold.

16. The maintenance method according to claim 15, wherein the method further comprises: detecting the moving speed of the movable bracket; and sending a fourth warning signal indicative of an abnormal elongation of the step chain when a moving speed of the movable bracket exceeds a fourth threshold.

* * * * *